United States Patent
Wei et al.

(10) Patent No.: US 12,081,629 B1
(45) Date of Patent: Sep. 3, 2024

(54) MACHINE LEARNING PIPELINE MANAGEMENT FOR AUTOMATED SOFTWARE DEPLOYMENT

(71) Applicant: Amazon Technologies, Inc., Seattle, WA (US)

(72) Inventors: Eric Wei, Seattle, WA (US); Christopher Robert Hartman, Seattle, WA (US); Daniel Robert Fuller, Herndon, VA (US)

(73) Assignee: Amazon Technologies, Inc., Seattle, WA (US)

( * ) Notice: Subject to any disclaimer, the term of this patent is extended or adjusted under 35 U.S.C. 154(b) by 45 days.

(21) Appl. No.: 17/547,814

(22) Filed: Dec. 10, 2021

(51) Int. Cl.
*G06F 8/60* (2018.01)
*G06F 16/00* (2019.01)
*G06F 16/14* (2019.01)
*H04L 15/16* (2006.01)
*H04L 67/51* (2022.01)

(52) U.S. Cl.
CPC .............. *H04L 67/51* (2022.05); *G06F 8/60* (2013.01)

(58) Field of Classification Search
CPC ..... H04L 67/51; H04L 63/0272; H04L 41/22; H04L 45/24; H04L 45/38; G06F 8/60; G06F 9/45558; G06F 2009/45595; G06F 9/5072; G06F 9/5077; G06F 2009/4557; G06F 9/505; G06F 8/77; G06F 8/71; G06F 709/203; G06F 709/201; G06F 709/22; G06F 709/223; G06F 709/226
USPC ...................................................... 709/227
See application file for complete search history.

(56) References Cited

U.S. PATENT DOCUMENTS

| | | | |
|---|---|---|---|
| 9,032,393 B1 * | 5/2015 | Allen | G06F 8/60 717/177 |
| 9,055,067 B1 * | 6/2015 | Ward, Jr. | H04L 47/72 |
| 9,602,360 B1 * | 3/2017 | Greenfield | G06F 9/5072 |
| 9,876,703 B1 * | 1/2018 | Arllen | H04L 43/55 |
| 10,613,970 B1 * | 4/2020 | Jammula | G06F 11/3688 |
| 11,269,616 B1 * | 3/2022 | Schumaker | G06F 8/65 |
| 11,379,217 B1 * | 7/2022 | Eberlein | G06F 9/44505 |
| 11,568,319 B2 * | 1/2023 | Cardoso | G06F 9/45558 |
| 11,620,128 B1 * | 4/2023 | Chawda | G06F 8/75 717/120 |

(Continued)

FOREIGN PATENT DOCUMENTS

| | | | | |
|---|---|---|---|---|
| CN | 115268940 A | * | 11/2022 | ........... G06F 40/186 |
| WO | WO-2015126409 A1 | * | 8/2015 | ........... G06F 9/4856 |

(Continued)

*Primary Examiner* — David R Lazaro
*Assistant Examiner* — Berhanu Shitayewoldetadik
(74) *Attorney, Agent, or Firm* — THOMAS HORSTEMEYER, LLP (57) ABSTRACT

Machine learning automatic pipeline management for automated software deployment is described. An adjustment to computing capacity for a region of a multi-region computing network is identified. A service to be deployed in the region of the multi-region computing network is further identified. Configuration settings for deployment of the service in the region is generated using past deployment data for the service in other regions of the multi-region computing network. A continuous code delivery service is directed to add a stage to a software deployment pipeline for the region. The stage may be configured using the at least one configuration setting.

20 Claims, 5 Drawing Sheets

(56) References Cited

U.S. PATENT DOCUMENTS

| | | | |
|---|---|---|---|
| 2006/0161661 A1* | 7/2006 | Johnson | H04L 61/5053 709/226 |
| 2006/0182034 A1* | 8/2006 | Klinker | H04L 45/3065 370/248 |
| 2011/0239243 A1* | 9/2011 | Dierks | H04N 21/812 725/24 |
| 2012/0159454 A1* | 6/2012 | Barham | G06F 11/3466 718/1 |
| 2013/0290382 A1* | 10/2013 | Adachi | G06F 16/16 707/813 |
| 2015/0026348 A1* | 1/2015 | Siddiqui | H04L 43/0894 709/226 |
| 2015/0066696 A1* | 3/2015 | Teuber | G06Q 30/0613 705/26.41 |
| 2016/0065589 A1* | 3/2016 | Leighton | H04L 63/123 726/4 |
| 2016/0216960 A1* | 7/2016 | Garman | H04L 67/34 |
| 2016/0286427 A1* | 9/2016 | Chakraborty | H04M 1/2535 |
| 2016/0350203 A1* | 12/2016 | Doganata | G06F 11/368 |
| 2017/0180266 A1* | 6/2017 | Frank | H04L 67/51 |
| 2017/0180459 A1* | 6/2017 | Frank | H04L 41/0866 |
| 2017/0180487 A1* | 6/2017 | Frank | G06F 11/3688 |
| 2017/0255460 A1* | 9/2017 | Frank | G06F 9/45558 |
| 2017/0262298 A1* | 9/2017 | Frank | G06F 8/65 |
| 2018/0144243 A1* | 5/2018 | Hsieh | G06F 11/30 |
| 2018/0165071 A1* | 6/2018 | Raghavan | G06F 8/35 |
| 2018/0173525 A1* | 6/2018 | Suparna | G06F 8/77 |
| 2018/0287903 A1* | 10/2018 | Joshi | H04L 43/062 |
| 2019/0138288 A1* | 5/2019 | Brealey | G06F 11/3688 |
| 2019/0171427 A1* | 6/2019 | Singh | G06F 8/77 |
| 2019/0205856 A1* | 7/2019 | Bell | G06Q 20/14 |
| 2019/0213346 A1* | 7/2019 | Friedman | G06F 21/6218 |
| 2019/0317757 A1* | 10/2019 | Jodoin | G06F 8/60 |
| 2019/0349369 A1* | 11/2019 | Bengtson | H04L 63/0281 |
| 2019/0349405 A1* | 11/2019 | Bengtson | H04L 63/0823 |
| 2020/0133964 A1* | 4/2020 | Lee | G06F 16/355 |
| 2020/0236164 A1* | 7/2020 | Anand | H04L 67/1085 |
| 2020/0241872 A1* | 7/2020 | Muddakkagari | G06F 8/71 |
| 2020/0409819 A1* | 12/2020 | Acharyya | G06F 11/0793 |
| 2021/0168036 A1* | 6/2021 | Qian | H04L 41/5009 |
| 2021/0349814 A1* | 11/2021 | Joshi | G06F 11/3688 |
| 2021/0357196 A1* | 11/2021 | Shekar | G06F 8/60 |
| 2021/0383037 A1* | 12/2021 | Segev | G06F 30/27 |
| 2022/0147743 A1* | 5/2022 | Roy | G06V 10/82 |
| 2022/0156059 A1* | 5/2022 | Schumaker | G06F 8/60 |
| 2022/0156631 A1* | 5/2022 | Kanso | G06F 8/60 |
| 2022/0236976 A1* | 7/2022 | Wiegley | G06F 8/71 |
| 2022/0334929 A1* | 10/2022 | Potyraj | G06F 3/067 |
| 2023/0034011 A1* | 2/2023 | Sarkar | G06F 40/30 |

FOREIGN PATENT DOCUMENTS

| | | | |
|---|---|---|---|
| WO | WO-2015126411 A1 * | 8/2015 | G06F 17/28 |
| WO | WO-2017112801 A1 * | 6/2017 | G06F 16/173 |

* cited by examiner

FIG. 5

MACHINE LEARNING PIPELINE MANAGEMENT FOR AUTOMATED SOFTWARE DEPLOYMENT

BACKGROUND

To meet increasing consumer demand for network services, new data centers are often brought online in various regions to handle consumer demand for those regions and/or to balance network traffic among existing regions. Bringing a data center online for a new region or zone is an incredibly complex operation, requiring physical hardware to be purchased and deployed in a physical data center and software be deployed on the physical hardware to integrate computing resources into an existing network. The software can include thousands to tens of thousands of services, applications, and so forth.

When a new data center is brought online, various service teams overseeing operation of a multitude of services may manage service pipelines, which are software deployment pipelines for services to be brought online in a new region. Deployment of services using a service pipeline is a manual operation and tends to be computationally expensive. As such, it can be desirable to move to fully automated deployment of software for new regions and zones that utilizes fewer computing resources, avoids periods of downtime, and requires less interaction from developers.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to machine learning automatic pipeline management for automated software deployment. Enterprises operate multi-region computing networks where data centers and other physical computing hardware are distributed geographically in various regions to account for consumer demand in those regions and otherwise distribute loads on the network. However, for a new data center to be integrated into the multi-region computing network and handle network traffic, various software applications and services must be configured on physical hosts of the data center. To this end, when a new data center is brought online, service teams overseeing operation of a multitude of services may maintain a pipeline in a code delivery service that assists in deploying a service to one or more regions of a multi-region computing network.

Deployment of services using a pipeline of a code delivery service today is a manual operation and is computationally expensive. For instance, configuration settings for a service must be manually defined when a new region is added to a computing network. As such, it can be desirable to move to fully automated deployment of software for new regions and zones that utilizes fewer computing resources, avoids periods of downtime, and requires less interaction from service teams and other developers.

According to various embodiments, a computing environment is described having one or more computing devices that identify when computing capacity of a region is to be adjusted. Adjustment of computing capacity may include, for example, scaling up computing capacity through introduction of a data center in the region. Introduction of a data center to a multi-region computing network may be referred to as a "new region," as will be described. Alternatively, adjustment of computing capacity may include, for example, scaling down computing capacity through removal of a data center, or portion thereof, in a region or coalescing multiple data centers into a single region.

When the computing environment identifies that computing capacity is to be adjusted for a region of a multi-region computing network, the computing environment may identify a service to be deployed in the region of the multi-region computing network. Thereafter, the computing environment may generate configuration settings for deployment of the service in the region. In some embodiments, the configuration settings are generated using past deployment data for the service used to deploy the service in other regions of the multi-region computing network. The computing environment may then direct a code delivery service to add a stage to a software deployment pipeline for the region, the stage being configured using the at least one configuration setting. In some embodiments, the computing environment may direct the code delivery service to automatically deploy the service in the region of the multi-region computing network, for instance, if certain deployment criteria is met.

In the following discussion, a general description of a system for machine learning automatic pipeline management and automated software deployment, and its components is provided, followed by a discussion of the operation of the same.

Figure 1:
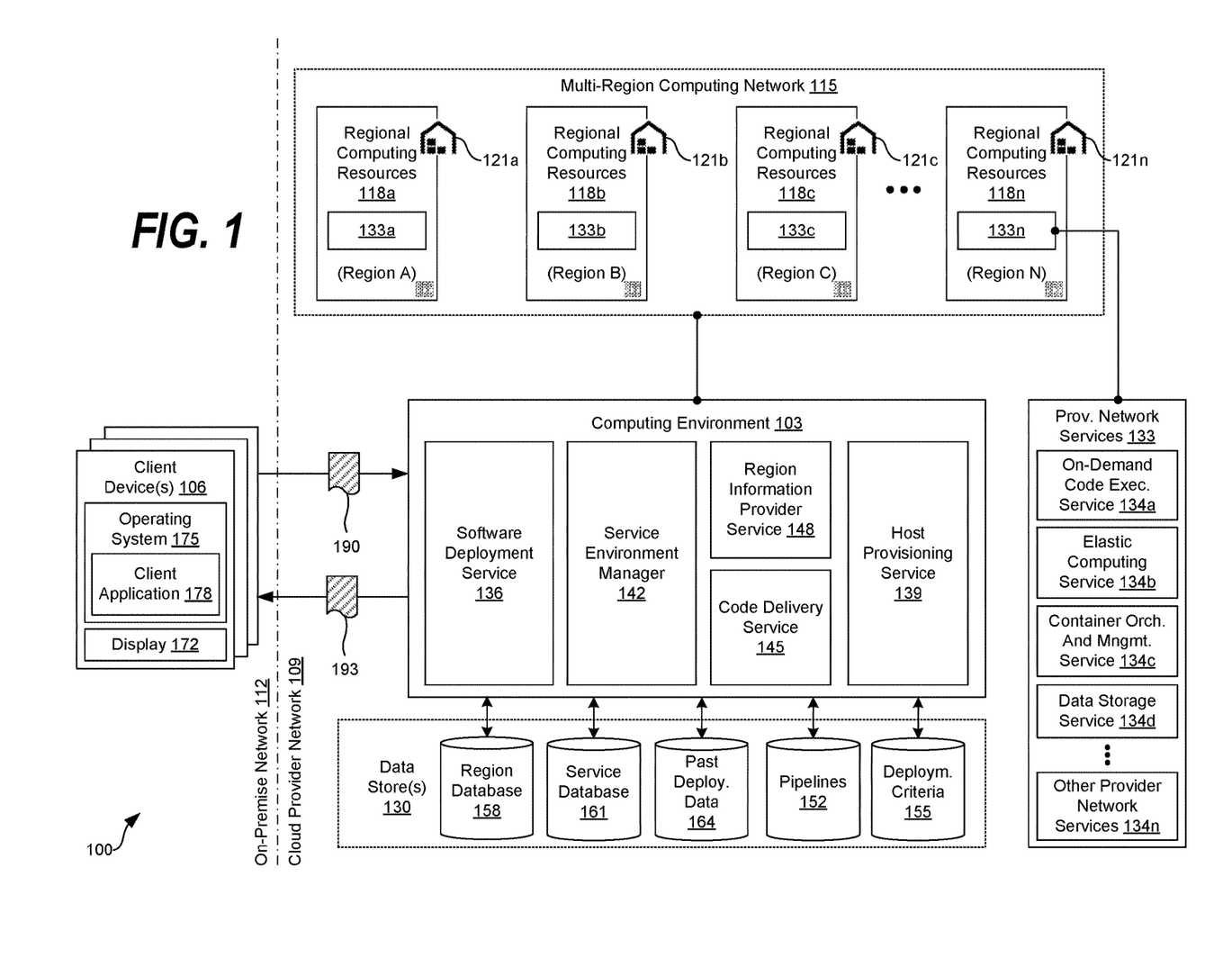
FIG. 1 is a drawing of a networked environment having a software deployment service according to various embodiments of the present disclosure.

With reference to FIG. 1, a networked environment 100 is shown according to various embodiments. The networked environment 100 includes a computing environment 103 and a client device 106, which are in data communication with each other via a network. The network includes, for example, the Internet, intranets, extranets, wide area networks (WANs), local area networks (LANs), wired networks, wireless networks, or other suitable networks, etc., or any combination of two or more such networks. For example, such networks may include satellite networks, cable networks, Ethernet networks, and other types of networks.

The networked environment 100 may include a cloud provider network 109 and an on-premise network 112 in some embodiments. To this end, the on-premise network 112 may include one or more computing devices, such as the client device 106 and other computing devices, that are deployed behind an enterprise firewall or devices coupled to a particular enterprise network.

The cloud provider network 109 (sometimes referred to simply as a "cloud") may include a pool of network-accessible computing resources, such as compute, storage, and networking resources, applications, and services, which may be virtualized or bare-metal. The cloud provider network 109 may provide convenient, on-demand network access to a shared pool of configurable computing resources that may be programmatically provisioned and released in response to customer commands. These resources may be dynamically provisioned and reconfigured to adjust to variable load. Cloud computing may thus be considered as both the applications delivered as services over a publicly accessible network (e.g., the Internet or a cellular communication network) and the hardware and software in cloud provider data centers that provide those services.

The cloud provider network 109 may be embodied among a number of regions, where a region is a separate geographical area in which the cloud provider clusters data centers. Each region may include two or more availability zones connected to one another via a private high-speed network, such as a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the computing environment 103 and/or the cloud provider network 109. Availability zones within a region may be positioned far enough away from one other that the same natural disaster might not take more than one availability zone offline at the same time.

Customers may connect to availability zones of the cloud provider network 109 via a publicly accessible network (e.g., the Internet or a cellular communication network) by way of a transit center (TC)). TCs may be considered as primary backbone locations linking customers to the cloud provider network, and may be collocated at other network provider facilities (e.g., Internet service providers, telecommunications providers) and securely connected (e.g. via a VPN or direct connection) to the availability zones. Each region may operate two or more TCs for redundancy.

Regions may be connected to a global network which includes private networking infrastructure (e.g., fiber connections controlled by the cloud provider) connecting each region to at least one other region. The cloud provider network 109 may deliver content from points of presence outside of, but networked with, these regions by way of edge locations and regional edge cache servers. This compartmentalization and geographic distribution of computing hardware enables the cloud provider network 109 to provide low-latency resource access to customers on a global scale with a high degree of fault tolerance and stability.

With cloud computing, instead of buying, owning, and maintaining their own data centers and servers, organizations may acquire technology, such as compute power, storage, databases, and other services, on an as-needed basis. The cloud provider network 109 thus may provide on-demand, scalable computing services, referred to herein as provider network services 133*a* . . . 133*n* (collectively "provider network services 133"), to users through a network, for example, allowing users to have at their disposal scalable "virtual computing devices" via their use of the compute servers and block store servers. These virtual computing devices have attributes of a personal computing device including hardware (various types of processors, local memory, random access memory (RAM), hard-disk and/or solid state drive (SSD) storage), a choice of operating systems, networking capabilities, and pre-loaded application software.

Each virtual computing device may also virtualize its console input and output (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users may choose to deploy their virtual computing systems to provide network-based services for their own use and/or for use by their customers or clients.

The cloud provider network 109 may implement various computing resources or services, which may include a virtual compute service, data processing service(s) (e.g., map reduce, data flow, and/or other large scale data processing techniques), data storage services (e.g., object storage services, block-based storage services, or data warehouse storage services), and/or any other type of network based services (which may include various other types of storage, processing, analysis, communication, event handling, visualization, and security services not illustrated). The resources required to support the operations of such services (e.g., compute and storage resources) may be provisioned in an account associated with a cloud provider, in contrast to resources requested by users of the cloud provider network 109, which may be provisioned in user accounts.

As such, the networked environment 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc.

The computing environment 103 may include, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may comprise a hosted computing resource, a grid computing resource, and/or any other distributed computing arrangement. In some cases, the computing environment 103 may correspond to an elastic computing resource where the allotted capacity of processing, network, storage, or other computing-related resources may vary over time.

In instances in which computing devices of the computing environment 103 are distributed in different geographical regions, zones, locations, and the like, the computing devices may together make up a multi-region computing network 115. For instance, one or more computing devices or other computing infrastructure may form up regional computing resources 118a . . . 118n (collectively "regional computing resources 118"). Each of the regional computing resources 118 may serve a region, such as a country or portion of a country, to account for demand of computing services, provide consumers with various physical goods and services, and so forth. As such, the regional computing resources 118 may include those physically located in a facility 121a . . . 121n (collectively "facilities 121"), where the facility 121 may include a data center, fulfillment center, or other installation located in a region, as may be appreciated.

It is understood that the facilities 121 may be distributed in different geographic locations. Additionally, when services are executing in a data center, for example, in a region, the services will attempt to utilize other services in the same region. As such, same versions or instances of a service may be deployed across hosts in different regions.

In one example, first regional computing resources 118a in a first facility 121a may provide electronic commerce-related web services that serve consumers in Australia, whereas second regional computing resources 118b in a second facility 121b may provide database storage web services for the Western portion of the United States. In another example, even though the regional computing resources 118 are distributed geographically, they may work in conjunction to provide a web service accessible from any region.

As may be appreciated, each of the regional computing resources 118 may include physical computing infrastructure, such as servers, memory devices, switches, routers, and other computing and network equipment. Additionally, each of the regional computing resources 118 may operate software and virtual resources on the physical infrastructure to provide various computing services, as will be described.

Various applications and/or other functionality may be executed in the computing environment 103 according to various embodiments. Also, various data is stored in a data store 130 that is accessible to the computing environment 103. The data store 130 may be representative of a plurality of data stores 130 as can be appreciated. The data stored in the data store 130, for example, is associated with the operation of the various applications and/or functional entities described below.

The components executed on the computing environment 103, for example, include a software deployment service 136, a host provisioning service 139, a service environment manager 142, a code delivery service 145, a region information provider service 148, the provider network services 133, and other applications, services, processes, systems, engines, or functionality not discussed in detail herein. As the provider network services 133 are shown executing in the regional computing resources 118, the provider network services 133 may include region-specific services in some embodiments, whereas the services executing in the computing environment are non-region-specific services. In any event, the provider network services 133 may include web services or cloud provider services that may be invoked using a network service call or an application programming interface (API) call made to a network-based API.

An API may refer to an interface and/or communication protocol between the client device 106 and one of the computing environments 103 (e.g., one or more servers), such that if the client device 106 makes a request in a predefined format, the client device 106 would receive a response in a specific format and/or initiate a predefined action. Similarly, an API may refer to an interface and/or communication protocol between different ones of the computing environments 103 (e.g., between different sets of one or more servers), such that if a first computing environment 103 makes a request in a predefined format to a second computing environment 103, the first computing environment 103 would receive a response in a specific format and/or initiate a predefined action.

In a context of a cloud provider network 109, APIs provide a gateway for customers to access cloud or remote computing infrastructure by allowing customers to obtain data from or cause actions within the cloud provider network 109, enabling the development of applications that interact with resources and services hosted in the cloud provider network 109. APIs can also enable different services of the cloud provider network 109 to exchange data with one another. The provider network services 133 may be a portion of one or more of the computing environments 103, and may be maintained and/or operated by a common entity. Alternatively, the provider network services 133 may be independent of the computing environments 103 in some examples and may be operated by a third-party.

In accordance with various embodiments, the provider network services 133 may include one or more of an on-demand code execution service 134a (also referred to as a serverless compute service, function compute service, functions service, cloud functions service, or functions-as-a-service, in various implementations), an elastic computing service 134b (referred to in various implementations as an elastic compute service, a virtual machines service, a computing cloud service, a compute engine, or a cloud compute service), a container orchestration and management service 134c (referred to in various implementations as a container service, cloud container service, container engine, or container cloud service), a data storage service 134d, as well as other provider network services 134n. For instance, other provider network services 134n may include a virtualization service, as well as other types of provider network services 133 as can be appreciated.

The on-demand code execution service 134a may offer "on-demand" execution of serverless functions without requiring a customer to provision and maintain a server or computing resources that require 24/7 uptime and a continuous subscription. As such, the on-demand code execution service 134a may also be referred to as a "serverless" compute service, function compute service, functions service, cloud functions service, or functions-as-a-service in various implementations. To this end, a cloud provider may charge a customer for only the computing resources required to execute a serverless function, which may include seconds, minutes, or hours of computing time instead of requiring a monthly subscription to provide constant uptime. Each of the serverless functions may include a script, code, or an application that is executed when a network-based API is invoked.

The elastic computing service 134b, for example, may offer virtual compute instances (referred to as virtual machines or simply "instances") with varying computational and/or memory resources, which are managed by the elastic computing service 134b, which may also be referred to in various implementations as a compute virtualization service, a virtual machines service, a computing cloud service, a compute engine, or a cloud compute service. In one embodiment, each of the compute instances may correspond to one of several instance types or families. An instance type may be characterized by its hardware type, computational resources (e.g., number, type, and configuration of CPUs or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics.

Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

It may be appreciated that such compute instances may also be able to run in other environments, for example, on the premises of customers (e.g., in the on-premise network 112), where such on-premise instances may be managed by the cloud provider or a third party. In some scenarios, the instances may be lightweight micro-virtual machines (microVMs). The cloud provider network 109 may offer other compute resources in addition to instances and microVMs, for example, containers (which may run in instances or bare metal) and/or bare metal servers that are managed by a portion of a cloud provider service running on an offload card of the bare metal server.

In some embodiments, the execution of instances by the elastic computing service 134b is supported by a lightweight virtual machine manager (VMM). The VMMs enable the launch of lightweight microVMs in non-virtualized environments in fractions of a second. These VMMs can also enable container runtimes and container orchestrators to manage containers as microVMs. These microVMs nevertheless take advantage of the security and workload isolation provided by traditional VMs and the resource efficiency that comes along with containers, for example, by being run as isolated processes by the VMM. A microVM, as used herein, refers to a VM initialized with a limited device model and/or with a minimal OS kernel that is supported by the lightweight VMM, and which can have a low memory overhead of less than 5 MiB per microVM, for example, such that thousands of microVMs can be packed onto a single host.

For example, a microVM can have a stripped-down version of an operating system (OS) kernel (e.g., having only the required OS components and their dependencies) to minimize boot time and memory footprint. In some implementations, each process of the lightweight VMM encapsulates one and only one microVM. The process can run at least one of the following threads: API, VMM, and vCPU(s). The API thread is responsible for the API server and associated control plane. The VMM thread exposes a machine model, minimal legacy device model, microVM metadata service (MMDS), and VirtIO device emulated network and block devices. In addition, there are one or more vCPU threads (one per guest CPU core). A microVM can be used in some implementations to run a containerized workload.

The container orchestration and management service 134c may enable customers to run containerized workloads, for example, on their own instances or on managed instances through a serverless container service. A container represents a logical packaging of a software application that abstracts the application from the computing environment 103 in which the application is executed. For example, a containerized version of a software application includes the software code and any dependencies used by the code such that the application can be executed consistently on any infrastructure hosting a suitable container engine (e.g., the Docker® or Kubernetes® container engine).

A container image may be a standalone, executable package of software that includes everything needed to run an application process, such as code, runtime, system tools, system libraries, and settings. Container images become containers at runtime. Containers are thus an abstraction of the application layer (meaning that each container simulates a different software application process). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, other configurations) used to enable the application to run in a container engine.

The data storage service 134d, for example, may be an elastic block store service (also referred to as a network-based data storage service, a cloud disks service, managed disk service, storage area network service, persistent disk service, or block volumes, in various implementations) that supports customer volumes. In general, a volume can correspond to a logical collection of data, such as a set of data maintained on behalf of a user. The data of the volume may be erasure coded and/or replicated between multiple devices within a distributed computing system in order to provide multiple replicas of the volume (where such replicas may collectively represent the volume on the computing system).

Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. Data may be accessed from the data storage service 134d using on or more API calls, and typically can be used to transfer data having large file sizes.

The software deployment service 136 is executed to automate the deployment of software when computing capacity to a multi-region computing network 115 is adjusted, such as when a new data center or other facility 121 is added to a region to service customers in that region. As may be appreciated, by placing a data center or other facility 121 in a region, it is understood that consumers in that region may be provided with web- and network-based services at a higher speed. Notably, latency and bandwidth is reduced in the multi-region computing network 115 as a facility 121 closer to a consumer is brought online that is capable of responding to various requests.

The host provisioning service 139 is executed to provision virtual hosts in a data enter or other facility 121. In some embodiments, the software deployment service 136 interacts with the host provisioning service 139 to provision a new host for a service to be executed thereon. For instance, when a new region is to be brought online, the software deployment service 136 may provision a host in the new region to deploy the service thereon.

The service environment manager 142 is executed to create, terminate, and manage environments hosted in a physical host for a service. In some examples, developers can utilize the client device 106 to create and manage separate environments for development, testing, and production. Additionally, the developers can deploy various versions of their service to different environments. As may be appreciated, environments may be temporary or long-running. As developers develop a service, the developers may deploy the service often to various regions, sometimes to different environments for different purposes. In some situations, developers may deploy to all of the instances in an environment simultaneously, or parse a deployment into batches, for instance, using rolling deployments.

The code delivery service 145 is executed assist service teams and other developers with building, testing, and deploying software into production environments through maintenance of a pipeline 152 having a multitude of stages. In some embodiments, the code delivery service 145 may include a continuous code delivery service although, in some embodiments, the code delivery service 145 may include a continuous integration code delivery service or other suitable type of code delivery service 145. In any event, the code delivery service 145 may maintain a pipeline 152 of stages of a service for deployment. For instance, the code delivery service 145 may automatically build, test, and deploy software to production when changes are made to source code of a service. However, before the service is deployed to production, a person, an automated test, and/or predefined deployment criteria 155 may be employed to determine whether deployment to production should occur.

A pipeline 152 may include a workflow having a series of stages that define how code changes to a service or other software application go through a release, for example, from a testing environment to a production environment. A stage of the pipeline 152 may include a logical unit that isolates code in an environment and may limit a number of concurrent changes in that environment. Each stage may include actions that are performed on code artifacts, which may include configuration settings of the service in some examples. As such, code artifacts of a service may include source code, configuration files, and so forth.

In some examples, a first stage of a pipeline 152 may include a build stage, where source code is built and tests are run, a second stage may include a deployment stage, where code is deployed to runtime environments, and so forth. Each stage may be formed up of a series of serial or parallel actions. An action for a stage of a pipeline 152 may include predefined operations performed on source code and configured so that the actions run in the pipeline 152 at a specified point. For instance, an action can be specified to trigger upon a code change or code check-in, an action can be specified to trigger to deploy the service to instances, and so forth.

The region information provider service 148 is executed to provide up-to-date information pertaining to regional computing resources 118, facilities 121, and associated information. To deploy a new region, an administrator may interact with the region information provider service 148 to add information associated with a new region to a region database 158. The information associated with the new region may include a name of the facility 121, a unique identifier generated for the facility 121, geographical coordinates, required computing resources, forecasted capacity, and so forth. In some examples, the region information provider service 148 may notify the software deployment service 136 automatically when new regions are added to the region database 158 or when existing regions are to be removed. Alternatively, the software deployment service 136 may query the region information provider service 148 for additions to or removals form the region database 158, for instance, upon an elapse of a predetermined amount of time.

The data stored in the data store 130 includes, for example, a region database 158, a service database 161, past deployment data 164, pipelines 152, deployment criteria 155, and potentially other data. The region database 158 may include information pertaining to regions as well as facilities 121 and regional computing resources 118 deployed therein. For instance, the region database 158 can include a list of regions as well as data associated with the regional computing resources 118 deployed in each of the regions.

The service database 161 may include a list of services deployed in each of the regions. Additionally, the service database 161 may indicate whether a service is a critical or dependent service, referring to the service being critical for other services to execute as intended. Past deployment data 164 includes configuration settings and other data associated with past deployments of a service. For instance, if a service has been deployed in Region A, past deployment data 164 may include the configuration of the service for Region A, and so forth.

As noted above, the pipelines 152 may include workflow having a series of stages that define how code changes to a service or other software application go through a release, for example, from a testing environment to a production environment. Pipelines 152 may include stages and actions associated with various stages. For instance, each stage may include actions that are performed on code artifacts, which may include configuration settings of the service in some examples. Deployment criteria 155 may refer to predefined constraints that, if met, cause a service to automatically be deployed in a new region, for example.

The client device 106 is representative of a plurality of client devices 106 that may be coupled to the network. The client device 106 may include, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 106 may include a display 172. The display 172 may include, for example, one or more devices such as liquid crystal display (LCD) displays, gas plasma-based flat panel displays, organic light emitting diode (OLED) displays, electrophoretic ink (E-ink) displays, LCD projectors, or other types of display devices, etc.

The client device 106 may be configured to execute an operating system 175 and/or various applications, such as a client application 178 and/or other applications. The client application 178 may be executed in a client device 106, for example, to access network content served up by the computing environment 103 and/or other servers, thereby rendering a graphical user interface on the display 172. To this end, the client application 178 may comprise, for example, a browser, a dedicated application, etc., and the user interface may include a network page, an application screen, etc. The client device 106 may be configured to execute applications beyond the client application 178 such as, for example, email applications, social networking applications, word processors, spreadsheets, and/or other applications.

Next, a general description of the operation of the various components of the networked environment 100 is provided. To begin, in some situations, it can be desirable for services deployed in a region of a multi-region computing network 115 to interact with other services in the same region. To this end, service teams often have, for example, one service environment per region or per facility 121 with which to interact to deploy a stable release of a service. Traditionally, service teams provide code 190 or other machine-readable instructions in order to perform manual code check-ins and update software running in physical hosts in a facility 121. The code delivery service 145 permits service teams to configure deployment of services and other software on the hosts, for instance, when code revisions are made and software updates are to be deployed in physical hosts in a facility 121.

For instance, assuming a multi-region computing network 115 includes twenty regions (e.g., twenty facilities 121), a service team can interact with the code delivery service 145 to deploy software updates according to a particular specification made by the service team. In one example, a service team might configure the code delivery service 145 to deploy a software update to a first region as a production test case, then later deploy the software update to the remaining nineteen regions of the multi-region computing network 115 when the software update is confirmed stable in the first region.

Accordingly, the software deployment service 136 is executed to identify adjustments to a region of a multi-region computing network 115, where adjustments may include adding regional computing resources 118 or removing regional computing resources 118. For instance, the addition of a facility 121 (e.g., a data center) to a region of the multi-region computing network 115 may cause traffic to be directed to the regional computing resources 118 of the new region in lieu of other regional computing resources 118 in other regions, thereby balancing a load on various regions of the multi-region computing network 115.

In various embodiments, the addition to or the removal of regional computing resources 118 from the multi-region computing network 115 may identified based on a new entry for the region being added to the region information provider service 148. For instance, an administrator may interact with the region information provider service 148 to add a new entry to the region database 158. In an instance in which a new region is added to the region information provider service 148, the region information provider service 148 may notify the software deployment service 136 of the addition, which may cause the software deployment service 136 to automatically deploy various services or other software in the new region.

Accordingly, the software deployment service 136 may identify one or more services to be deployed in the region of the multi-region computing network 115. The software deployment service 136 may then interact with the host provisioning service 139 to provision physical hosts for the region. In some embodiments, the software deployment service 136 identifies that there is no service environment for a particular service, service team account, and/or region. In this instance, the software deployment service 136 directs the host provisioning service 139 to provision physical hosts for the region as well as provision a service environment for the service and/or service team account that is deployed on the physical hosts. In some embodiments, the host provisioning service 139 may automatically attempt to identify existing computing resources for the facility 121, or will order new computing resources if existing computing resources are not available.

Thereafter, the software deployment service 136 may automate deployment of the service, for instance, using machine learning to determine various settings for the service to be deployed in the region. In various embodiments, the software deployment service 136 may generate one or more configuration settings for deployment of the service in the region using, for example, past deployment data 164 for the service deployed in other regions of the multi-region computing network 115. The configuration settings may include, for example, code artifacts that are used to automatically build code into an executable application or service, as may be appreciated.

In some embodiments, the configuration settings are generated for the deployment of the service in new region using the past deployment data 164 by identifying differences and similarities in the configuration settings between deployments of the service in the other regions of the multi-region computing network 115. Further, the software deployment service 136 may determine values of the configuration settings for deployment of the service in the region using one or more machine learning routines, such as a clustering routine, a nearest neighbor routine, a convolutional neural network (CNN) routine, and so forth.

For example, the software deployment service 136 may determine configuration settings in deploying a service in Europe (e.g., Region A) and configuration settings used in deploying the same service in Asia (e.g., Region B). Differences between the configuration settings of Region A and Region B may be identified, if any, which may indicate that those configuration settings are region-specific configuration settings. As such, the software deployment service 136 may determine values for the region-specific configuration settings, or other configuration settings varying among regions. Additionally, similarities between the configuration settings of Europe (e.g., Region A) and Asia (e.g., Region B) may be identified, if any, which may indicate that those configuration settings are not region-specific configuration settings. As such, the software deployment service 136 may determine values for the non-region-specific configuration settings based on the values of the configuration setting deployed in Europe (e.g., Region A) and Asia (e.g., Region B).

Thereafter, the software deployment service 136 may direct the code delivery service 145 to add a stage to a software deployment pipeline for the region, where the stage is configured using the configuration settings as generated. In some embodiments, the code delivery service 145 is a continuous code delivery service that maintains a pipeline of services for deployment. For instance, a service team, tasked with overseeing building, deployment, and/or maintenance of a service, may have one or more pipelines associated with a service team account. The software deployment service 136 may identify the service team account corresponding to the service and add a stage to a pipeline associated with the service, for example. When a stage is added to a pipeline, a client device 106 of a service team member overseeing the service may be sent a notification 193, for example.

In some embodiments, the software deployment service 136 may direct the code delivery service 145 to automatically deploy the service in the region of the multi-region computing network 115 using, for example, the configuration settings determined for the service. In some embodiments, the software deployment service 136 may deploy the service in a first region before deploying the service in a second region. To this end, the software deployment service 136 may direct the code delivery service 145 to deploy the service in the first region of the multi-region computing network 115, and, after the service is deployed in the first region and/or after an elapse of a predetermined amount of time, direct the code delivery service 145 to deploy the service in the second region of the multi-region computing network 115.

Further, in various embodiments, the software deployment service 136 may identify the service as one of a multitude of services to be deployed in the region of the multi-region computing network 115. The software deployment service 136 may create a build environment for the region and, in response to computing capacity being adjusted in the region, migrate the service from the build environment to a production environment for the region. At least one of the build environment and the production environment may include at least one of, for example, a computing environment, an elastic computing container, a host class, and a virtual private cloud generated for each of the plurality of services to be deployed in the region.

Figure 2:
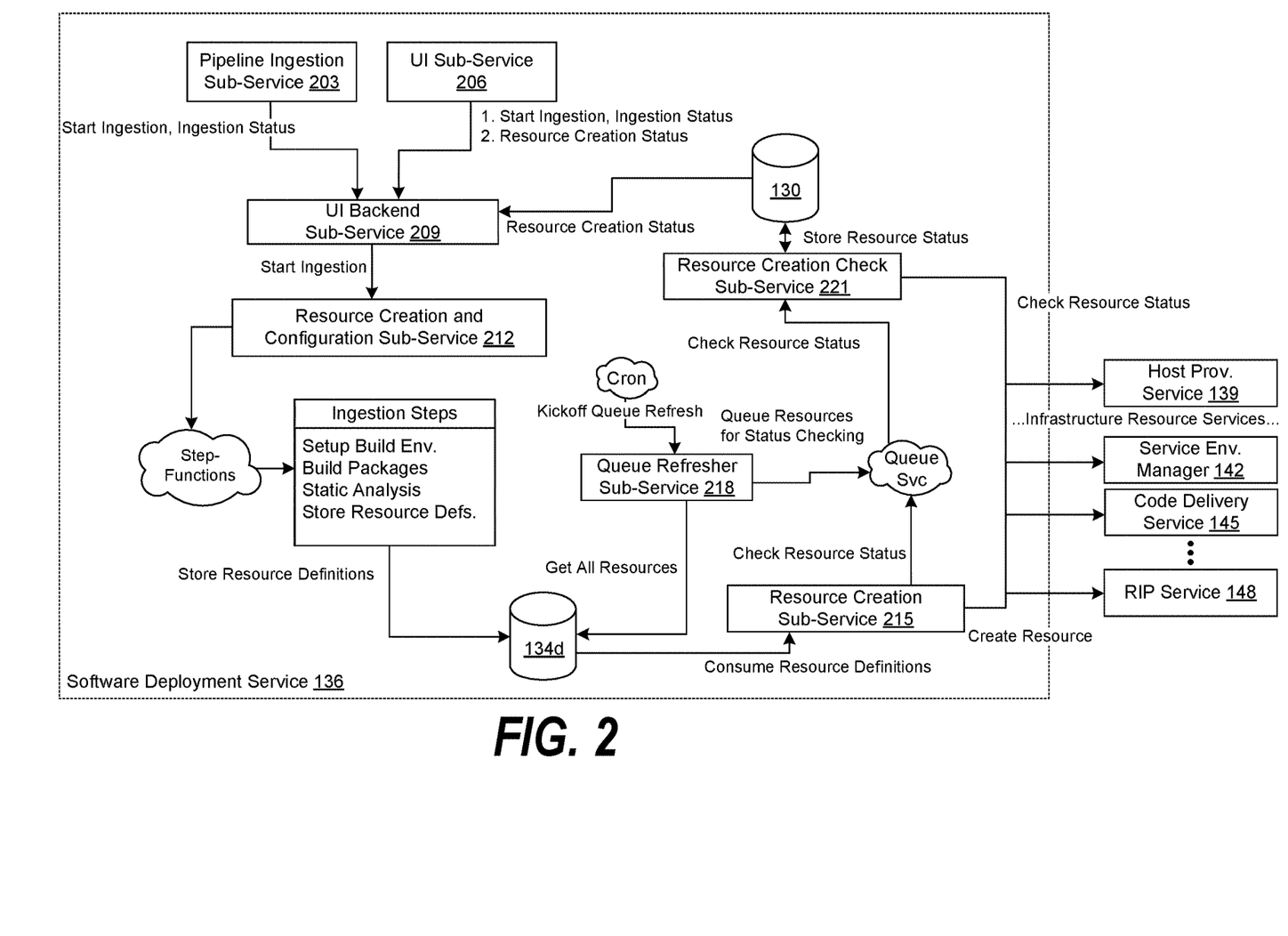
FIG. 2 is a schematic diagram illustrating sub-services of the software deployment service according to various embodiments of the present disclosure.

Turning now to FIG. 2, a schematic diagram is shown illustrating various sub-services of the software deployment service 136 according to various embodiments of the present disclosure. In some embodiments, the software deployment service 136 includes a pipeline ingestion sub-service 203, a user interface sub-service 206, a user interface backend sub-service 209, a resource creation and configuration sub-service 212, a resource creation sub-service 215, a queue refresher sub-service 218, and a resource creation check sub-service 221, as well as potentially other services, applications, engines, and so forth.

The pipeline ingestion sub-service 203 is executed to ingest pipelines 152 and provide data associated therewith to the user interface backend sub-service 209 and/or the resource creation and configuration sub-service 212. The user interface sub-service 206 is configured to receive data from developers through a console or one or more user interfaces provided on the client device 106. The user interface backend sub-service 209 aggregates the data from the pipeline ingestion sub-service 203 and the user interface sub-service 206, and provides the aggregated data to the resource creation and configuration sub-service 212.

The resource creation and configuration sub-service 212 is executed to gather data from various sources and store the data in the data store 130 for subsequent access. Based on the aggregated data, the resource creation and configuration sub-service 212 may identify new regions, determine that stages and actions for pipelines 152 should be created, determine that new hosts are required for new regions, determine that service environments are required for new regions, set up build environments, build service packages, perform static analysis of code, store resource definitions, and so forth.

Based on aggregated data, the resource creation and configuration sub-service 212 may direct the resource creation sub-service 215 to perform various actions, such as modifying a pipeline 152 (e.g., adding a stage and/or action), create a new region through interaction with the region information provider service 148, etc. As such, the resource creation sub-service 215 may communicate with the host provisioning service 139 to provision hosts, the service environment manager 142 to create new environments, the code delivery service 145 to adjust pipelines 152, the region information provider service 148 to add regions, etc. The resource creation sub-service 215 may perform events, which may be placed in a queue to await execution. The queue may be periodically polled or queried by the queue refresher sub-service 218 to ensure proper and timely performance of events in the queue. The resource creation check sub-service determines whether events were performed successfully, determine whether events were performed out of band, and the like.

Figure 3:
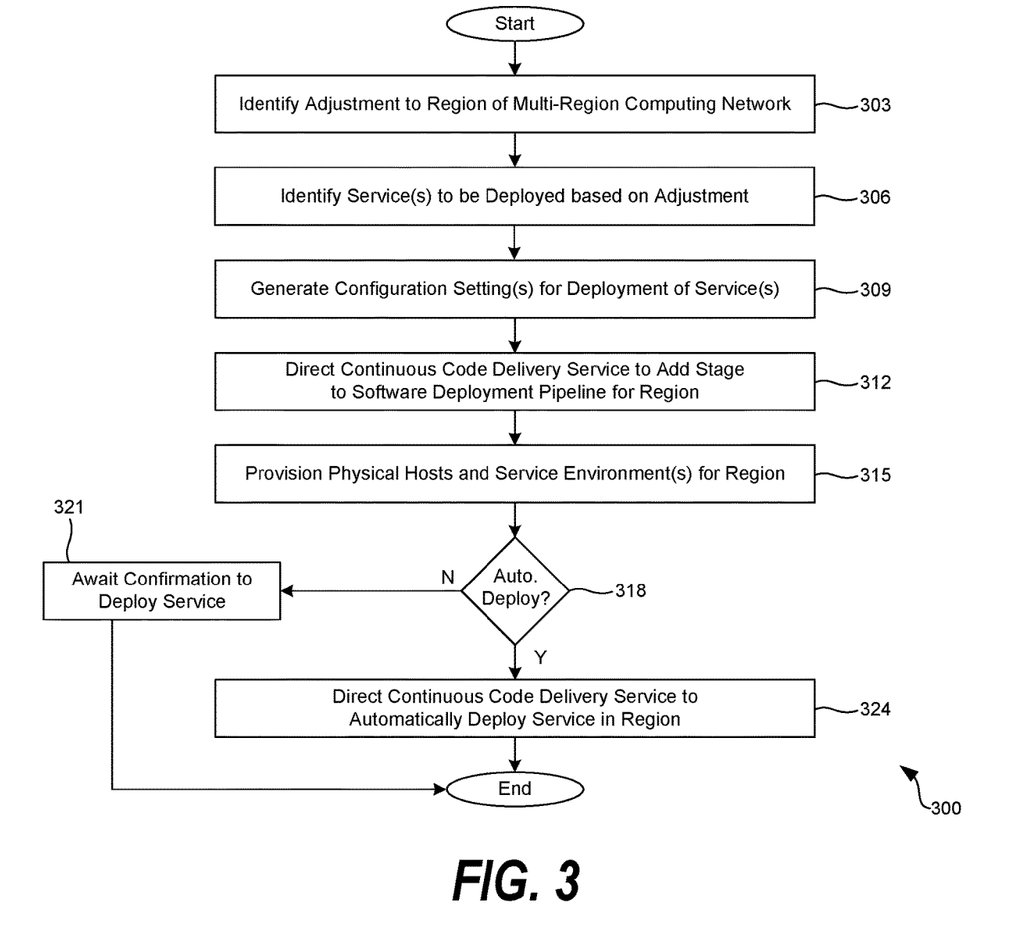
FIG. 3 is a flowchart illustrating one example of functionality implemented as portions of a software deployment service executed in a computing environment in the networked environment of FIG. 1 according to various embodiments of the present disclosure.

Referring next to FIG. 3, a flowchart 300 is shown that provides one example of the operation of a portion of the software deployment service 136 according to various embodiments. It is understood that the flowchart 300 of FIG. 3 provides merely an example of the many different types of functional arrangements that may be employed to implement the operation of the portion of the software deployment service 136 as described herein. As an alternative, the flowchart 300 of FIG. 3 may be viewed as depicting an example of elements of a method implemented in the computing environment 103 according to one or more embodiments.

Beginning with box 303, the software deployment service 136 may identify an adjustment to a region of a multi-region computing network 115. In some embodiments, the adjustment to the region may include an increase of computing capacity, such as through the introduction of a data center having physical computing hardware. It is understood that the addition of a data center to a region of the multi-region computing network 115 may cause traffic to be directed to the newly-added data center in lieu of other data centers in other regions, thereby balancing a load on various regions of the multi-region computing network 115. In other embodiments, the adjustment to the region may include a decrease in computing capacity, such as through a decommissioning or a reduction in computing capacity of a data center.

In some embodiments, the adjustment to the region of a multi-region computing network 115 is identified based on a new entry for the region being added to the region information provider service 148. For instance, an administrator may interact with the region information provider service 148 to add a new entry to a region database 158. In an instance in which a new region is added to the region information provider service 148, the region information provider service 148 may notify the software deployment service 136 of the addition, which may cause the software deployment service 136 to automatically deploy various services or other software in the new region. The computing capacity being adjusted (e.g., increased or decreased) may include central processing unit (CPU) capacity; graphics processing unit (GPU) capacity; memory capacity; load balancing capacity; networking capacity, and so forth.

Accordingly, in box 306, the software deployment service 136 may identify one or more services to be deployed in the region of the multi-region computing network 115. To this end, in some embodiments, the software deployment service 136 may query a service database 161 to identify the services to be deployed in new regions which may have been stored in the service database 161 in association with a setting that triggers automatic deployment when a new region is added. In some embodiments, the software deployment service 136 may invoke intelligence and identify services operational in other regions, such as basic services needed for other services to function.

Next, in box 309, the software deployment service 136 may generate one or more configuration settings for deployment of the service in the region using, for example, past deployment data 164 for the service deployed in other regions of the multi-region computing network 115. The configuration settings may include, for example, code artifacts that are used to automatically build code into an executable application or service.

In some embodiments, the at least one configuration setting is generated for the deployment of the service in new region using the past deployment data 164 by identifying a difference in the at least one configuration setting between deployments of the service in the other regions of the multi-region computing network 115, and determining a value of the at least one configuration setting for deployment of the service in the region using at least one machine learning routine.

The at least one machine learning routine may include a clustering routine, a nearest neighbor routine, a convolutional neural network routine, and so forth. In some embodiments, the at least one machine learning routine is trained using forecasting data, new region planning data (e.g., data pertaining to new geographic regions and settings), and so forth. For instance, clustering routines may be executed on geographic locations of customers accessing a particular region, and a new region to be deployed may be identified based on the clusters. To this end, it can be determined whether it is financially feasible to deploy a new region to serve customers when a threshold number of consumers has been located in a particular cluster. Based on a forecasted demand for a new region, a shift of traffic may be observed and demand forecasts for other regions may be lessened.

The software deployment service 136 may determine configuration settings in deploying a service in Region A and configuration settings used in deploying the same service in Region B. Differences between the configuration settings of Region A and Region B may be identified, if any, which may indicate that those configuration settings are region-specific configuration settings. As such, the software deployment service 136 may determine a value for the region-specific configuration settings, or other configuration settings varying among regions.

In additional embodiments, the at least one configuration setting is generated for the deployment of the service in new region using the past deployment data 164 by identifying similarities in the at least one configuration setting between deployments of the service in the other regions of the multi-region computing network 115, and determining a value of the at least one configuration setting for deployment of the service in the region using at least one machine learning routine. The at least one machine learning routine may include a clustering routine, a nearest neighbor routine, a convolutional neural network routine, and so forth.

For example, the software deployment service 136 may determine configuration settings in deploying a service in Region A and configuration settings used in deploying the same service in Region B. Similarities between the configuration settings of Region A and Region B may be identified, if any, which may indicate that those configuration settings are not region-specific configuration settings. As such, the software deployment service 136 may determine a value for the non-region-specific configuration settings based on the values of the configuration setting deployed in Region A and Region B.

To this end, in one example, the software deployment service 136 may identify past deployment data 164 for a predetermined number of past deployments (e.g., last five deployments) of a service. The configurations settings that are the same among the past deployments will be kept the same, and configuration settings being different among the past deployments will be determined using machine learning techniques.

In box 312, the software deployment service 136 may direct the code delivery service 145 to add a stage to a software deployment pipeline for the region, where the stage is configured using the one or more configuration settings generated in box 309. In some embodiments, the code delivery service 145 is a continuous code delivery service that maintains a pipeline of services for deployment. For instance, the continuous code delivery service may automatically build, test, and deploy software to production when changes are made, for instance, to source code of the software. However, before the software is deployed to production, a person, an automated test, and/or predefined criteria may be employed to determine whether deployment to production should occur.

As such a service team, tasked with overseeing building, deployment, and/or maintenance of a service, may have one or more pipelines associated with a service team account. The software deployment service 136 may identify the service team account corresponding to the service and add a stage to a pipeline associated with the service, for example.

In box 315, the software deployment service 136 may interact with the host provisioning service 139 to provision physical hosts for the region. In some embodiments, the software deployment service 136 identifies that there is no service environment for a particular service, service team account, and/or region. In this instance, the software deployment service 136 directs the host provisioning service 139 to provision physical hosts for the region as well as provision a service environment for the service and/or service team account that is deployed on the physical hosts. In some embodiments, the host provisioning service 139 will automatically attempt to identify existing computing resources for the facility, or will order new computing resources if existing computing resources are not available. In some embodiments, physical hosts are only provisioned in the event a stage is added to a software deployment pipeline. To this end, computing resources are not utilized or allocated until the stage has been added.

In box 318, the software deployment service 136 may determine whether to automatically deploy the service in the region. In some embodiments, the service team overseeing a service may predefine one or more values in the data store 130 that indicates that their service it to be automatically deployed in a new region. In various embodiments, the team overseeing a service may predefine automatic deployment criteria that, if met, causes the service to be automatically deployed in the region without manual intervention.

If the software deployment service 136 determines that the service is not to be automatically deployed in the region, the process may proceed to box 321. In box 321, the software deployment service 136 may await confirmation to deploy the service. For instance, the software deployment service 136 may await a manual confirmation from the service team overseeing the service to deploy the service. Thereafter, the process may proceed to completion.

Referring back to box 315, if the software deployment service 136 determines that the service is to be automatically deployed in a region, the process may proceed to box 324. In box 324, the software deployment service 136 may direct the code delivery service 145 to automatically deploy the service in the region of the multi-region computing network 115.

In some embodiments, the software deployment service 136 may deploy the service in a first region before deploying the service in a second region. To this end, the software deployment service 136 may direct the code delivery service 145 to deploy the service in the first region of the multi-region computing network 115, and, after the service is deployed in the first region and/or after an elapse of a predetermined amount of time, direct the code delivery service 145 to deploy the service in the second region of the multi-region computing network 115.

Further, in various embodiments, the software deployment service 136 may identify the service as one of a multitude of services to be deployed in the region of the multi-region computing network 115. The software deployment service 136 may create a build environment for the region and, in response to computing capacity being adjusted in the region, migrate the service from the build environment to a production environment for the region. At least one of the build environment and the production environment may include at least one of, for example, a computing environment, an elastic computing container, a host class, and a virtual private cloud generated for each of the plurality of services to be deployed in the region. Thereafter, the process may proceed to completion.

Figure 4:
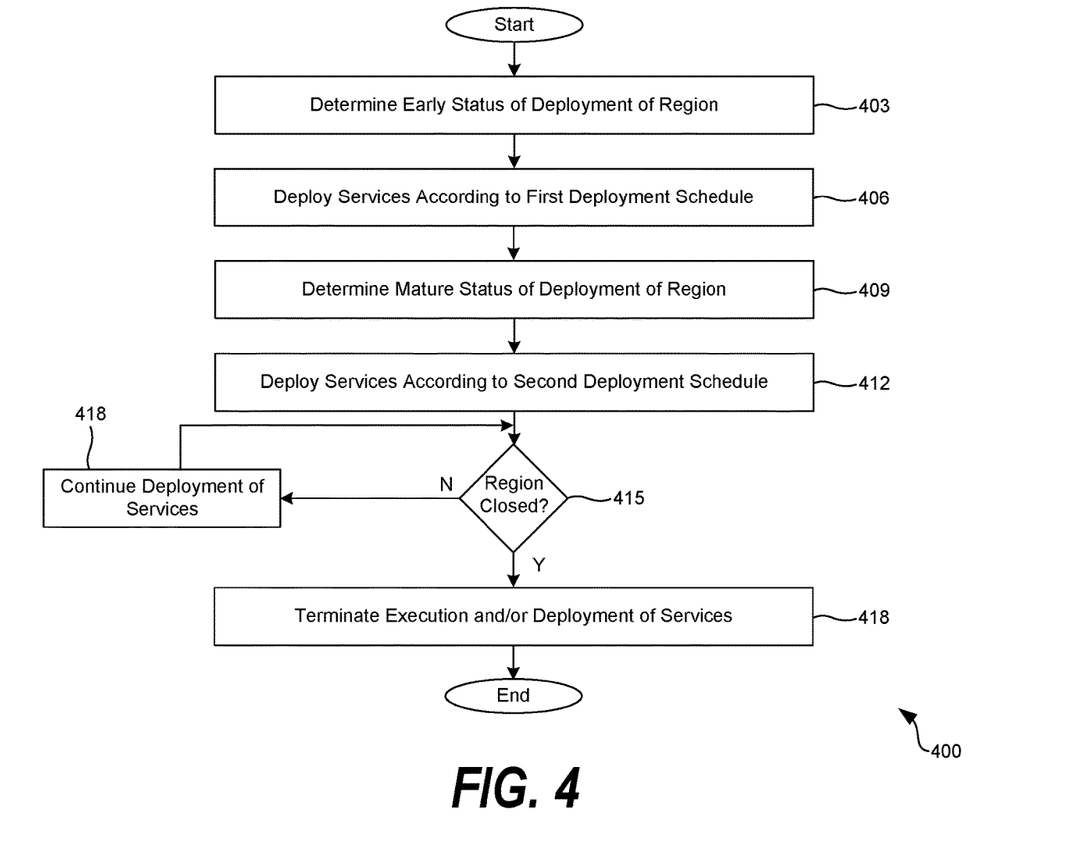
FIG. 4 is a flowchart illustrating one example of functionality implemented as portions of a software deployment service executed in a computing environment in the networked environment of FIG. 1 according to various embodiments of the present disclosure.

Moving along to FIG. 4, a flowchart 400 is shown that provides one example of the operation of a portion of the software deployment service 136 according to various embodiments. It is understood that the flowchart 400 of FIG. 4 provides merely an example of the many different types of functional arrangements that may be employed to implement the operation of the portion of the software deployment service 136 as described herein. As an alternative, the flowchart 400 of FIG. 4 may be viewed as depicting an example of elements of a method implemented in the computing environment 103 according to one or more embodiments.

Beginning with box 403, the software deployment service 136 may determine an early status of deployment of a region. For instance, the software deployment service 136 may recognize that a region has been deployed for approximately one week to six months, indicating the region is newly deployed. As such, in some examples, the region will not be publicly facing, but may act as a development or testing environment prior to public launch. Hence, the software deployment service 136 may determine an age of the region from the region information provider service 148 or the region information provider service 148 may provide the early status of the region directly to the software deployment service 136.

Thereafter, in box 406, the software deployment service 136 may deploy one or more services in the region according to a first deployment schedule. To this end, the software deployment service 136 may direct the code delivery service 145 to deploy software updates aggressively as the region is not yet public by inserting suitable stages in various pipelines 152. In some examples, the software deployment service 136 may direct the code delivery service 145 to deploy every day, every couple of days, and so forth.

In box 409, the software deployment service 136 may determine a mature status of deployment of a region. For instance, the software deployment service 136 may recognize that a region has been deployed for approximately six months to a year, indicating the region is becoming mature. As such, in some examples, the region may be publicly facing, thereby acting as a production environment. Accordingly, the software deployment service 136 may determine an age of the region from the region information provider service 148 or the region information provider service 148 may provide the mature status of the region directly to the software deployment service 136.

Next, in box 412, the software deployment service 136 may deploy one or more services in the region according to a second deployment schedule that is different from the first deployment schedule. For example, the software deployment service 136 may direct the code delivery service 145 to deploy software updates less aggressively than the first deployment region (e.g., slower) as the region is public, where the code delivery service 145 is directed through insertion of suitable stages in various pipelines 152. In some examples, the software deployment service 136 may direct the code delivery service 145 to deploy every month, even other month, and so forth.

Next, in box 415, the software deployment service 136 may determine whether a region has been closed. If the region is not closed, the process may proceed to box 418. In box 418, the software deployment service 136 may continue the deployment of services, as described above in boxes 403-412, for example. Referring again to box 415, if the region is closed, the process may proceed to box 418. In box 418, the software deployment service 136 may terminate execution of services and/or the deployment of additional services. Thereafter, the process may proceed to completion.

Figure 5:
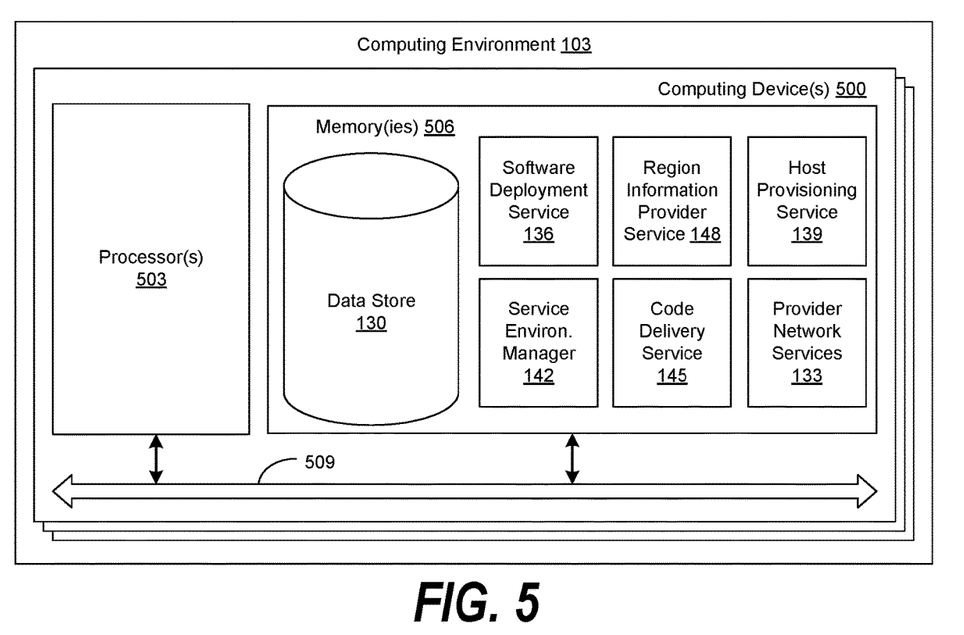
FIG. 5 is a schematic block diagram that provides one example illustration of a computing environment employed in the networked environment of FIG. 1 according to various embodiments of the present disclosure.

With reference to FIG. 5, a schematic block diagram of the computing environment 103 is shown according to an embodiment of the present disclosure. The computing environment 103 includes one or more computing devices 500. Each computing device 500 includes at least one processor circuit, for example, having a processor 503 and a memory 506, both of which are coupled to a local interface 509. To this end, each computing device 500 may include, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the provider network services 133, the software deployment service 136, the host provisioning service 139, the service environment manager 142, the code delivery service 145, the region information provider service 148, and potentially other applications. Also stored in the memory 506 may be a data store 130 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the provider network services 133, the software deployment service 136, the host provisioning service 139, the service environment manager 142, the code delivery service 145, the region information provider service 148, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3 and 4 show the functionality and operation of an implementation of portions of the software deployment service 136. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the provider network services 133, the software deployment service 136, the host provisioning service 139, the service environment manager 142, the code delivery service 145, and the region information provider service 148, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the provider network services 133, the software deployment service 136, the host provisioning service 139, the service environment manager 142, the code delivery service 145, and the region information provider service 148, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 500, or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device comprising at least one hardware processor that, when executed, directs the at least one computing device to:
   identify, in response to a query from a software deployment pipeline, that a region is to be added to a multi-region computing network in which additional computing capacity is to be added through provisioning of additional physical computing hardware;
   place an event in a queue, the queue comprising one or more events to be performed and the event representing adding the region to the multi-region computing network;
   in response to the region being added to the multi-region computing network, notify the software deployment pipeline to identify a plurality of services to be deployed in the region;
   train and execute at least one machine learning routine to generate at least one configuration setting for a deployment of each of the plurality of services in the region using past deployment data for the plurality of services in other regions of the multi-region computing network;
   direct a continuous code delivery service to add a stage to the software deployment pipeline for each of the plurality of services for the region, the stage being configured using the at least one configuration setting;
   direct the continuous code delivery service to automatically deploy the plurality of services in the region using the stage, wherein a speed of deployment will be based at least in part on whether the region is public; and
   periodically poll the queue to determine if the event has been performed within a period of time.

2. The non-transitory computer-readable medium of claim 1, wherein the additional computing capacity is at least one of: central processing unit (CPU) capacity; graphics processing unit (GPU) capacity; memory capacity; load balancing capacity; and networking capacity.

3. The non-transitory computer-readable medium of claim 1, wherein the at least one computing device is further directed to:
   identify that the computing capacity is to be added for the region of the multi-region computing network by identifying a new entry for the region being added to a region information provider (RIP) service;
   in response to the new entry being identified, create a build environment for the region;
   direct the continuous code delivery service to automatically deploy the plurality of services in the build environment; and
   in response to additional computing resources being added in the region, migrate the plurality of services from the build environment to a production environment for the region,
   wherein at least one of the build environment and the production environment comprises at least one of: a computing environment; an elastic computing container; a host class; and a virtual private cloud (VPC) generated for each of the plurality of services to be deployed in the region.

4. A system, comprising:
   at least one computing device comprising a processor and a memory; and
   program instructions stored in the memory and executable in the at least one computing device that, when executed, direct that the at least one computing device to:
   identify, in response to a query from a software deployment pipeline, that computing capacity is to be adjusted for a region of a multi-region computing network;
   place an event in a queue, the queue comprising one or more events to be performed and the event representing adjusting the computing capacity for the region of the multi-region computing network;
   notify the software deployment pipeline to identify a service to be deployed in the region of the multi-region computing network;
   generate at least one configuration setting for a deployment of the service in the region using past deployment data for the service deployed in other regions of the multi-region computing network;
   add a stage to the software deployment pipeline for the region, the stage being configured using the at least one configuration setting;
   determine a status of deployment of the region, the status being one of an early status or a mature status of deployment;
   in an instance in which the status is the early status, deploy the service according to a first deployment schedule;
   in an instance in which the status is the mature status, deploy the service according to a second deployment schedule different than the first deployment schedule, wherein the second deployment schedule is a slower deployment of the service than the first deployment schedule based at least in part on whether the second deployment is public; and
   periodically poll the queue to determine if the event has been performed within a period of time.

5. The system of claim 4, wherein the adjustment to the computing capacity comprises an addition of computing capacity through introduction of a physical data center in the region of the multi-region computing network, the physical data center comprising physical computing hardware added to the multi-region computing network.

6. The system of claim 5, wherein the adjustment to the computing capacity is identified based on a new entry for the region being added to a region information provider (RIP) service.

7. The system of claim 4, wherein the at least one configuration setting is generated for the deployment of the service in new region using the past deployment data by:
identifying a difference in the at least one configuration setting between deployments of the service in the other regions of the multi-region computing network; and
determining a value of the at least one configuration setting for deployment of the service in the region using at least one machine learning routine.

8. The system of claim 4, wherein the at least one computing device is further directed to automatically deploy the service in the region of the multi-region computing network using a continuous code delivery service.

9. The system of claim 4, wherein the computing capacity is at least one of: central processing unit (CPU) capacity; graphics processing unit (GPU) capacity; memory capacity; load balancing capacity; and networking capacity.

10. The system of claim 4, wherein:
the region of the multi-region computing network in which the computing capacity is to be adjusted is a first region of the multi-region computing network;
the at least one computing device is further directed to:
identify that computing capacity is to be adjusted for a second region of the multi-region computing network;
direct a continuous code delivery service to deploy the service in the first region of the multi-region computing network; and
after the service is deployed in the first region, direct the continuous code delivery service to deploy the service in the second region of the multi-region computing network.

11. The system of claim 4, wherein the at least one computing device is further directed to:
identify that computing capacity is to be adjusted for the region of the multi-region computing network by identifying a new entry for the region being added to a region information provider (RIP) service;
identify the service as one of a plurality of services to be deployed in the region of the multi-region computing network;
in response to the new entry being identified, create a build environment for the region; and
in response to physical computing resources being adjusted in the region, migrate the service from the build environment to a production environment for the region.

12. The system of claim 11, wherein at least one of the build environment and the production environment comprises at least one of: a computing environment; an elastic computing container; and a virtual private cloud (VPC) generated for each of the plurality of services to be deployed in the region.

13. A computer-implemented method, comprising:
identifying, in response to a query from a software deployment pipeline, that a region is to be added to a multi-region computing network in which additional computing capacity is to be added through provisioning of additional physical computing hardware;
placing an event in a queue, the queue comprising one or more events to be performed and the event representing adding the region to the multi-region computing network;
in response to the region being added to the multi-region computing network, notifying the software deployment pipeline to identify a service to be deployed in the region;
generating at least one configuration setting for a deployment of the service in the region using past deployment data for the service in other regions of the multi-region computing network;
directing a continuous code delivery service to add a stage to software deployment pipeline for the region, the stage being configured using the at least one configuration setting;
directing the continuous code delivery service to automatically deploy the service in the region, wherein a speed of deployment will be based at least in part on whether the region is public; and
periodically poll the queue to determine if the event has been performed within a period of time.

14. The computer-implemented method of claim 13, further comprising identifying that the region is to be added to the multi-region computing network by communicating with a region information provider (RIP) service to identify a new entry for the region being added to a data store.

15. The computer-implemented method of claim 13, wherein the additional computing capacity is at least one of: central processing unit (CPU) capacity; graphics processing unit (GPU) capacity; memory capacity; load balancing capacity; and networking capacity.

16. The computer-implemented method of claim 13, wherein the region of the multi-region computing network in which the computing capacity is to be adjusted is a first region of the multi-region computing network, and the computer-implemented method further comprises:
identifying that additional computing capacity is to be introduced for a second region of the multi-region computing network; and
after the service is deployed in the first region and after an elapse of a predetermined amount of time, directing the continuous code delivery service to automatically deploy the service in the second region of the multi-region computing network.

17. The computer-implemented method of claim 16, further comprising identifying that at least one configuration setting is region-specific based on at least a difference in values between the at least one configuration settings in the first region and the at least one configuration setting in the second region.

18. The computer-implemented method of claim 13, further comprising:
identify the service as one of a plurality of services to be deployed in the region of the multi-region computing network;
in response to a new entry being identified, create a build environment for the region; and
in response to physical computing resources being added in the region, migrate the service from the build environment to a production environment for the region.

19. The computer-implemented method of claim 18, wherein at least one of the build environment and the production environment comprises at least one of: a computing environment; an elastic computing container; a host class; and a virtual private cloud (VPC) generated for each of the plurality of services to be deployed in the region.

20. The computer-implemented method of claim 13, wherein the at least one configuration setting is stored in a code artifact for the service.

\* \* \* \* \*